W. S. WEATHERWAX.
STEERING WHEEL HUB AND AXLE CONNECTION.
APPLICATION FILED MAY 24, 1912.

1,086,251.

Patented Feb. 3, 1914.
2 SHEETS—SHEET 1.

Witnesses
Wm. H. Mulligan.
V. B. Hillyard.

Inventor
W. S. Weatherwax
By Victor J. Evans
Attorney

W. S. WEATHERWAX.
STEERING WHEEL HUB AND AXLE CONNECTION.
APPLICATION FILED MAY 24, 1912.
1,086,251.
Patented Feb. 3, 1914.
2 SHEETS—SHEET 2.
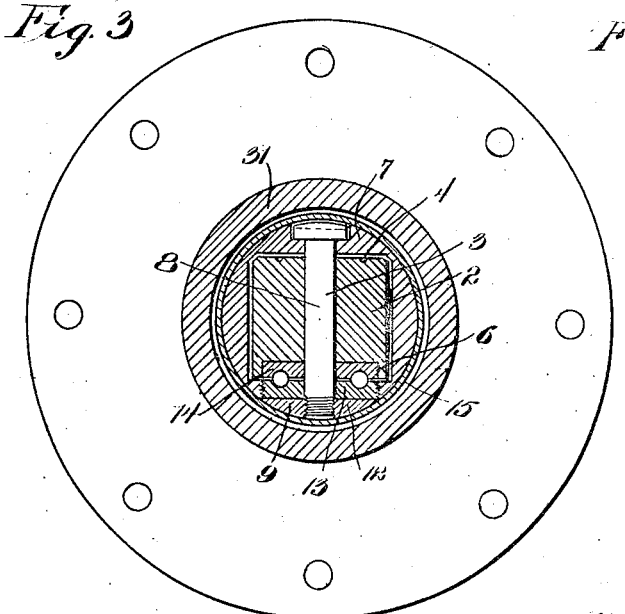

UNITED STATES PATENT OFFICE.

WALTER S. WEATHERWAX, OF SILVER CITY, NEW MEXICO.

STEERING-WHEEL HUB AND AXLE CONNECTION.

1,086,251.  Specification of Letters Patent.  Patented Feb. 3, 1914.

Application filed May 24, 1912. Serial No. 899,447.

*To all whom it may concern:*

Be it known that I, WALTER S. WEATHERWAX, a citizen of the United States, residing at Silver City, in the county of Grant and State of New Mexico, have invented new and useful Improvements in Steering-Wheel Hubs and Axle Connections, of which the following is a specification.

The present invention relates most especially to the means for connecting steering wheels to the axles of vehicles, such as automobiles and mechanically propelled vehicles of various types.

The invention relates to the connection between a wheel and its axle, whereby the wheel may be turned about an approximately vertically arranged axis located substantially in the plane of the wheel, thereby minimizing the strain on the pivot connections and admitting of the axle being of a maximum length and the wheel support of a minimum length so that in addition to the advantages herein stated the vehicle may be enabled to turn in a comparatively small radius.

The invention consists of the novel features, details of construction and combination of parts, which hereinafter will be more particularly set forth, illustrated in the accompanying drawings, and pointed out in the appended claims.

Figure 1:
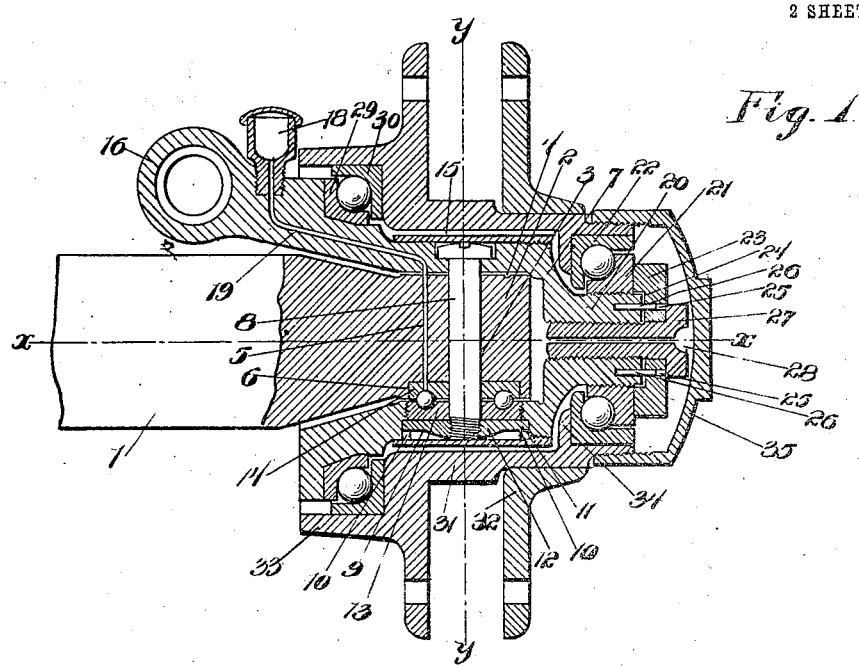
Figure 2:
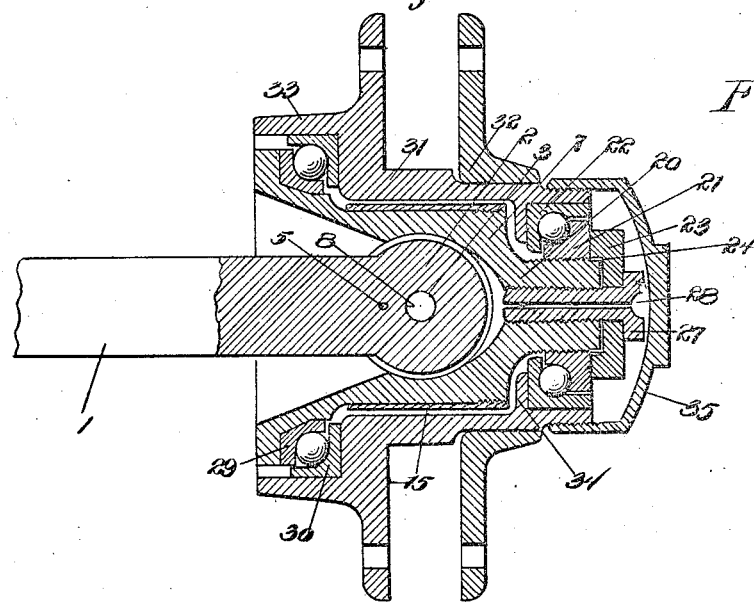

Referring to the drawings, forming a part of the specification, Figure 1 is a vertical central longitudinal section of the end portion of an axle and a vehicle wheel hub mounted thereon in accordance with the invention. Fig. 2 is a horizontal section on the line $x$—$x$ of Fig. 1. Fig. 3 is a transverse section on the line $y$—$y$ of Fig. 1. Fig. 4 is a view of the wheel support as seen from the inner end. Fig. 5 is a top plan view of an end portion of the axle. Fig. 6 is a detail view of the lower side of the wheel support. Fig. 7 is a detail view of the lock washer for the pivot bolt which connects the wheel support to the axle. Fig. 8 is a detail view of the lock washer for the cone of the outer ball bearing between the wheel support and hub.

Corresponding and like parts are referred to in the following description, and indicated in all the views of the drawings, by the same reference characters.

The axle 1 terminates in a head 2 in which is formed a vertical opening 3. The head 2 is somewhat rounding in plan elevation and has an oil groove 4 in its upper side and an oil opening 5 extending vertically therethrough. A recess 6 is formed in the under side of the head 2. The portion of the axle adjacent the head 2 is tapered so as to provide a substantial connection between the body of the axle and the head.

The wheel support 7 is hollow and receives the end portion of the axle. The middle portion of the wheel support has the opening formed therein of a size to receive the head 2 of the axle and is formed in its upper and its lower sides with openings to register with the openings 3 of the head 2 so as to receive the pivot bolt 8 by means of which the wheel support is connected to the head of the axle to admit of its turning about the pivot bolt 8 as a vertical axis. The opening formed in the upper side of the wheel support is enlarged to receive the head of the bolt and the opening formed in the lower side is of a size to receive the ball bearing formed between the head 2 and the wheel support. The opening 9 formed in the lower side of the wheel support has vertical grooves 10 at opposite points to receive lugs 11 at opposite edges of a lock washer 12 threaded upon the lower end of the pivot bolt 8 so as to prevent turning of said lock washer and the ball bearing. The upper face of the lock washer is corrugated to match like corrugations formed on the lower side of the lower member 13 of the ball bearing, which is threaded into the opening 9. The upper member 14 of the ball bearing is fitted into the recess 6 formed in the under side of the head 2. The two members 13 and 14 have matching grooves in their opposing faces which form a race to receive the balls constituting the antifriction bearing. The opening 5 formed in the head 2 leads into an opening formed in the member 14, thereby supplying oil to the ball bearing. A sleeve 15 encircles the middle portion of the wheel support and is threaded thereto and closes the openings formed in the upper and lower sides of the wheel support.

The inner portion of the wheel support is enlarged to receive the tapered portion of the axle and has an inwardly extending arm 16 to which the steering rod is connected. The opening formed in the inner end of the wheel support is elongated horizontally to admit of a pivotal movement of the wheel support for purposes of steering. An oil cup 18 is fitted to the arm 16 and connects with an opening 19 which is arranged to deliver oil to the opening 5 and the oil groove 4. The outer end of the wheel support is contracted, as indicated at 20. This contracted end is formed with a threaded opening and is exteriorly threaded. A ball bearing is mounted upon the contracted end 20 and comprises a cone 21 and a cup 22 between which the balls are confined. The cone 21 is threaded upon the part 20 and is adjustable to prevent any lost motion between the component parts of the ball bearing. A lock washer 23 is adapted to secure the cone 21 in the adjusted position and has a recess 24 in its inner face to receive the projecting end of the part 20. Openings 25 formed in the lock washer 23 receive the projecting ends of pins 26 let into the outer end of the part 20, thereby preventing rotary movement of the lock washer. The inner face of the lock washer is corrugated, the corrugations meshing with like corrugations formed in the outer face of the cone 21. A bolt 27 is threaded into the part 20 and is adapted to secure the lock washer 23. An opening 28 is formed in the bolt 27 and admits of lubricant passing therethrough into the opening or space provided in the wheel support to receive the outer end of the axle. A ball bearing is mounted upon the inner portion of the wheel support and comprises a cone 29 and a cup or retainer 30 between which balls are mounted.

The hub of the wheel is mounted upon the wheel support, the friction being reduced to the smallest amount possible by means of the inner and the outer ball bearings. The ball bearings are located upon opposite sides of a plane passing through the pivot bolt 8 parallel with the plane of the wheel. The hub comprises an inner member 31 and an outer member 32, each of the members having an outer flange. The spokes are confined between the flanges of the two members 31 and 32. The inner member 31 has a flange or band 33 which extends over the inner ball bearing and the inner enlarged part of the wheel support. The outer portion of the member 31 encircling the outer contracted end 20 of the wheel support has an inner shoulder 34 against which the outer ball bearing is confined. A hub cap 35 is threaded upon the outer end of the member 31 of the hub and is adapted to receive grease or hard oil.

When the parts are assembled the vertical axis about which the wheel turns when steering is approximately in the plane of the wheel, with the result of enabling a support for the wheel of minimum length being employed so that the strain upon the wheel support and connections is reduced to the smallest amount possible. The construction is such as to relieve the strain upon the steering mechanism and to enable the wheel to track when the vehicle is moving in a direct line. A further advantage resides in the fact that the steering wheel may be used as a driver, since the propelling force may be advantageously applied thereto.

From the foregoing description, taken in connection with the accompanying drawings, the advantages of the construction and of the the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. In combination an axle having a vertical opening in its outer portion and a recess in its under side in line with the vertical opening, a wheel support slipped upon the axle and having openings in its upper and lower portions in register with the vertical opening of the axle, the lower opening being enlarged and threaded, a pivot connection between the wheel support and axle passing through the vertically alined openings thereof, a ball bearing slipped upon the lower portion of the pivot connection and extending into the recess of the axle and threaded into the enlarged opening of the wheel support, and a lock washer having screwthread connection with the lower projecting end of the said pivot connection and having interlocking connection with the wheel support.

2. In combination an axle having a rounded head at its outer end in which is formed a vertical opening and a recess in its under side, a wheel support slipped upon the outer portion of the axle and having openings in its upper and lower portions to register with the vertical opening in the head of the axle, the lower opening being enlarged and threaded, a pivot connection between the wheel support and axle, a ball bearing between the lower portions of the head of the axle and the wheel support and having a member entering the recess of said head and a member threaded into the enlarged opening of the said wheel support, a lock washer threaded upon the lower projecting end of the pivot connection and arranged within the said enlarged opening of the wheel support, and a sleeve fitted upon the wheel support and closing the openings formed in the upper and lower portions thereof.

In testimony whereof I affix my signature in presence of two witnesses.

WALTER S. WEATHERWAX.

Witnesses:
 ROLAND D. HAVEN,
 JNO. A. MENARD, Jr.